Figure 1:
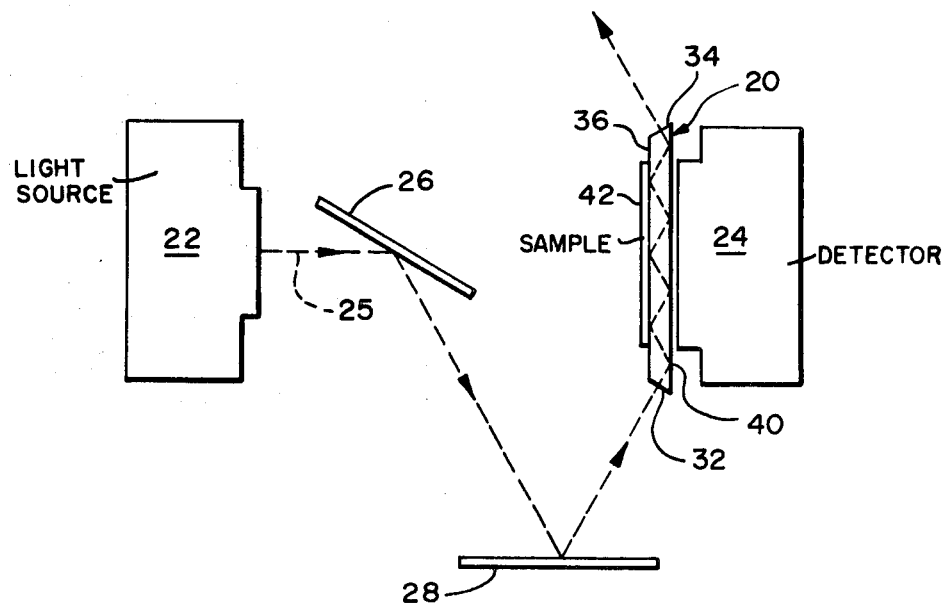

United States Patent

[11] 3,604,927

| [72] | Inventor | Tomas Hirschfeld<br>Thousand Oaks, Calif. |
|---|---|---|
| [21] | Appl. No. | 594,860 |
| [22] | Filed | Nov. 16, 1966 |
| [45] | Patented | Sept. 14, 1971 |
| [73] | Assignee | Block Engineering, Inc.<br>Cambridge, Mass. |

[54] TOTAL REFLECTION FLUORESCENCE SPECTROSCOPY
5 Claims, 2 Drawing Figs.

[52] U.S. Cl. ..................................................... 250/71 R,
356/38, 356/74, 356/244
[51] Int. Cl. ..................................................... G01n 21/52
[50] Field of Search ............................................. 88/14 SA,
14 SE, 14 SI; 350/96; 250/71, 71.5; 356/36, 38,
74, 51, 103, 85

[56] References Cited
UNITED STATES PATENTS

| 336,257 | 2/1886 | Palmer ......................... | 350/92 |
| 2,971,429 | 2/1961 | Howerton..................... | 88/14 (SE) |
| 3,279,307 | 10/1966 | Wilks ........................... | 88/14 (SA) |
| 3,308,709 | 3/1967 | Harrick ....................... | 88/14 (SA) |

OTHER REFERENCES

Harrick: " Total Internal Reflection and its Application to Surface Studies," Annals of the New York Academy of Sciences, Volume 101, 1963, page 935

*Primary Examiner*—Ronald L. Wibert
*Assistant Examiner*—F. L. Evans
*Attorney*—Robert J. Schiller ABSTRACT: A fluorescence spectroscopic device and method of using an attenuated, total, multiple reflection slab on one surface of which a sample is placed. A beam of fluorescence-exciting radiation is passed through the slab by multiple reflections. A detector is located alongside the slab and out of the path of any of the exciting radiation to pick up fluorescent emission passing through the cell and across the path of the exciting radiation. The slab thereby serves as a noloss secondary filter with respect to the fluorescence, permitting the latter to be easily distinguishable from the exciting radiation even where the wavelengths are similar.

PATENTED SEP 14 1971 3,604,927

INVENTOR.
TOMAS HIRSCHFELD
BY
Robert J. Schuller
ATTORNEY

TOTAL REFLECTION FLUORESCENCE SPECTROSCOPY

This invention relates to spectroscopy and more particularly to the determination of the fluorescence spectrum of a sample excited by the evanescent wave of total reflection.

Fluorescent radiation emitted by an excited medium is often used in spectroscopic studies of substances, particularly in analytical determination. It is a much more sensitive procedure than absorption spectroscopy, and can provide more complete data (excitation and emission spectra, quantum efficiency, quenching and the like). One of its main virtues lies in the high selectivity of the procedure due to the available choice of both the excitation and emission wavelengths.

The technique, as usually practiced, uses a beam of exciting radiation directed onto the medium or sample under scrutiny, filtering of emitted radiation from the sample to discriminate between exciting and fluorescent radiation, and examination of the fluorescent radiation with a detector. This system possesses several drawbacks. Filtering, either by use of a secondary filter or a monochromator, wastes a considerable part of the emitted light and complicates the system. Besides, the resolution of the filter is often not good enough to detect fluorescence emitted at a wavelength very close to the exciting one. The difficulty of distinguishing between scattered or reflected excitation light and resonance fluorescence (the type where reemission occurs without change in wavelength and which should be most common) has made the latter unobservable in condensed (i.e. liquid or solid) phases. For the usual design of fluorescence cells, the size and position of the emitting portion of a sample establish geometric requirements which, for good measurement linearity, become almost impossible stringent as the concentration of the sample is increased. Thus, linearity and reproducibility suffer. Lastly, reabsorption of emitted fluorescence makes working with concentrated solutions both difficult and inaccurate.

The present invention therefore has a principal object, the determination of the fluorescence spectrum of a sample by exciting fluorescence with the evanescent wave of total reflection, thereby permitting the problems heretofore noted in conventional fluorescence spectroscopy to be overcome.

Another important object of the present invention is to provide spectroscopic means including a total internally reflecting cell adapted to form an interface with a medium under examination, and detector means disposed outside of the path of the exciting radiation directed through the cell and positioned to examine fluorescence induced in that medium by the exciting radiation.

Other objects of the invention will in part be obvious and will in part appear hereinafter. The invention accordingly comprises the apparatus possessing the construction, combination of elements, and arrangement of parts which are exemplified in the following detailed disclosure and the several steps and the relation of one or more of such steps with respect to each of the others and the scope of the application of which will be indicated in the claims.

Figure 2:
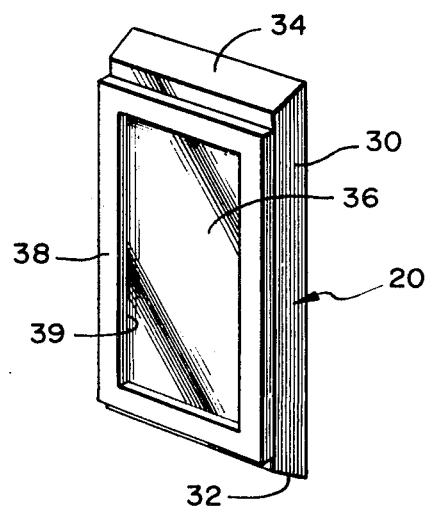

For a fuller understanding of the nature and objects of the present invention, reference should be had to the following detailed description taken in connection with the accompanying drawings wherein:

FIG. 1 is a schematic view of an exemplary device embodying the principles of the present invention; and FIG. 2 is an enlarged perspective view of a total internally reflecting cell structure useful in the embodiment of FIG. 1.

When a light beam, travelling in a medium of a given refractive index, arrives at an interface between the first medium and a second medium of relatively lower index of refraction, there will be set up a wave in the second medium. This wave (termed an evanescent wave) travels parallel to the interface and attenuates exponentially in a direction normal to the interface. If the second medium is nonabsorbent the wave eventually returns all of its energy to the reflected beam in the first medium, thus making the reflection total. However, if the second medium is absorbent, some of the energy of the evanescent wave will be extracted and the reflection is no longer quite total. This phenomenon, know as attenuated total reflection (ATR), was first applied to absorption spectroscopy in 1959 by Fahrenfort who measured the energy in the reflected beam to determine the extent of absorption by the sample.

Briefly, the present invention uses the phenomenon of total reflection to induce fluorescence in a sample by the energy of the evanescent wave, and by suitable means, provides for observation of the fluorescence which the sample then emits. Thus, the invention comprises a source of exciting radiation, a total internal reflection cell, one surface of which forms an interface with the sample, and means for detecting fluorescent radiation induced in the sample. If there is vibrational deactivation of the excited state in the sample, or internal conversion, the emitted radiation will be of lower energy, i.e. larger wavelength than the absorbed exciting radiation. If resonance fluorescence occurs, it will be at the same wavelength as the exciting radiation. While secondary filtering will allow discrimination in the former instance, no such result can be thus achieved in the latter case. However, in the present invention, the detection means is located so that substantially none of the exciting radiation, either directly or by scattering is incident on the sensitive area of the detector, but substantially all radiation seen by the latter is induced fluorescence. Not only does this permit excellent discrimination, but the cell then serves as a no-loss secondary filter and its selectivity does not depend upon wavelength differences as is the case with a secondary filter.

Referring now to FIG. 1 of the drawing there is shown a device embodying the principles of the present invention and comprising total internally reflecting means or cell 20, source 22 of a beam of exciting radiation, and means 24 for detecting radiation emitted from cell 20.

As one condition for obtaining total reflection fluorescence, cell 20 must provide an optical path through material with a greater refractive index than the range of indeces of samples to be examined. It must also be transparent over the wavelength range to be studied and should possess good physical and chemical stability. Typically, among the materials which can be used as glasses, synthetic organic polymers, quartz and the like, as illustrated in the following table of exemplary materials:

| Material | Refractive index (at 589 m$\mu$) | Range of wavelengths for study (in m$\mu$) |
| --- | --- | --- |
| Methyl methacrylate | 1.487 | 355-750 |
| Polystyrene | 1.588 | 390-750 |
| Crown glass | 1.491 | 340-750 |
| Flint glass | 1.683 | 400-750 |
| Natural quartz | 1.545 | 240-750 |
| Fused silica | 1.458 | 240-750 |

Source 22 preferably provides beam 25 of radiation within a selected narrow band of wavelengths, i.e. monochromatic, which can be varied at will. Hence, source 22 is typically a monochromator or the like, such as the Beckman DU spectrophotometer. The latter usually includes means for collimating output beam 25 which, for reasons adduced later, is a desirable feature. Cell 20 and source 22 are disposed so that a beam of exciting radiation can traverse the cell, preferably with minimal refraction at the input interface, by multiple reflections within the cell. To this end, source 22 in the configuration shown, is aided by auxiliary optics such as mirrors 26 and 28.

Detection means 24, typically of the type such as a monochromator, is capable of examining, through an input aperture, a selected wavelength within a particular spectral range and is positioned to one side of cell 20 so as to be substantially out of the path of radiation, either direct or scattered, from source 22 traversing cell 20.

While cell 20 can assume a number of configurations; as shown in FIG. 2, a preferred embodiment (with thicknesses exaggerated for clarity) of total reflection cell 20 comprises a rectangular, flat sheet 30 of material transparent to the beam of exciting radiation. The largest sides of the sheet are substantially parallel to one another. Thus, typically cell 20 can comprise a 3×1 inch silica microscope slide of about 1 mm. thickness. The shortest edges 32 and 34 of the slide are polished and bevelled at angles judiciously chosen with respect to the critical angle for internal reflection and to the length of the slide so that a proper path length can be provided to achieve internal multiple total reflection between edges 32 and 34 with the beam entering one of the shortest edge about normal to its surface and leaving the other shortest edge in similar manner.

One of the largest sides of the slide, e.g. side 36 bears peripheral mirror 38, for example of four glass pieces cemented together to form a hollow rectangle and having silvered or aluminized surfaces in contact with side 36. This provides a well or central depression 39 with respect to side 36, into which a sample can be placed, as well as avoiding light loss by leakage around the edges of the sample. The other largest side 40 of the slide is positioned closely adjacent or against the entrance pupil of detector means 24.

For convenience, source 22 is positioned so that the axis of beam 25 is horizontal and mirror 26 is inclined at the same angle as the level of edge 32, for example 30°, to the beam axis and in the path of the beam. Light deflected by mirror 26 deflects the beam issuing from the slit of source 22 to lateral mirror 28 positioned, for example, parallel to the axis of the initial beam from source 22. Cell 20 is preferably positioned vertically with its largest faces normal to the axis of the initial beam such that the bevel surface of bottom edge 32 is parallel to mirror 26. Mirror 28 is blackened over most of its surface leaving a narrow reflecting zone or slit of, for example, 10×1 mm. Hence, light from the slit of source 22, reflected by mirror 26 falls on the reflecting zone of the mirror 28 and thence on edge 32 normally to the surface of the latter. It is preferred thus to introduce the exciting beam with substantially minimal refraction from edge 32 in order to avoid chromatic effects in the beam.

The closer to the critical angle the internally reflected beam is directed, generally the internal reflections needed are lesser in number to effect fluorescent excitation, because the evanescent wave penetrates more deeply and more energy can be absorbed. For this reason, the more collimated input light beam 25 is, the shorter need be the plate to achieve the same result.

In operation, sample 42 is placed in contact with side 36 of cell 20 (as in well 39 of FIG. 2) so as to form a reflecting interface. Exciting radiation from source 22 is directed through edge 32 into cell 20 wherein it undergoes multiple total internal reflection and issues from cell 20 at edge 34. During the transit of the beam through cell 20, the evanescent waves due to the reflections at side 36 excite fluorescent in the sample, the absorption slightly attenuating the exciting beam. The fluorescent radiation travels through cell 20 to side 40 (i.e. substantially perpendicular to the mean path of the exciting beam), emerging from the latter to be detected by detection means 24.

The fluorescence is invariably lesser in intensity than the excitation radiation and usually does not exceed 40 percent at maximum, such as in fluorescein. Generally fluorescense is several orders of magnitude less than the exciting radiation intensity. However, as will be seen, the latter does not affect the detecting means which is out of its path. Further, scattering is no particular problem. The penetration of the evanescent wave is believed to be as little as 1/20λ when reflection is far off the critical angle. In order for scattered radiation to contribute to the detector input it must be fairly wide angle scattering because the detector input aperture axis is substantially perpendicular to the mean path of the exciting beam, i.e. it examines radiation substantially normal to the reflecting surface. But to achieve wide angle scattering, the particles must be small relative to penetration and if so, the intensity of wide angle scattering from such small particles is negligibly low.

With the device shown, the excitation spectrum of sample 42 can be examined, i.e. detection means 24 can be set to examine but a single wavelength (or more accurately a narrow wavelength band) and the wavelength of exciting beam 25 can be scanned or varied across a wide range. Similarly, the emission spectrum of sample 24 can be examined as by holding the wavelength of beam 25 fixed and operating detection means 24 to scan a range of wavelengths of the input fluorescent radiation.

This device used to study the fluorescence of fluorescein in solutions in the 1–1,000 p.p.m. concentration range, determined that the intensity/concentration relationship remained linear up to concentrations of several hundred p.p.m., as against about 5 p.p.m. in conventional fluorescence measurements. Even the addition of small quantities of $CS_2$ to the sample, which almost eliminated fluorescence in prior art measurement techniques due to its absorption, had fairly small effect on measurements made with the present invention.

An unusual application of the present invention was demonstrated by coating surface 36 first with a thin gelatine layer. Water-saturated hexane was then contacted with fluorescein and filtered. The extremely dilute solution obtained was still capable of making the cell surface fluorescent when excited because when applied to the gelatine layer, the latter served to extract and concentrate the dyestuff. Such a technique using gelatine or gelled ion-exchange resins provides a more highly sensitive method of determining fluorescent spectra than conventional extraction absorption or fluorescence methods.

It will be apparent that the present invention provides several advantages over conventional techniques heretofore commonly used. For one, the excitation beam penetrates so shallowly that even where the sample is a highly turbid solution, that as heretofore noted, wide angle scattering is negligible. This small penetration is also helpful in studying highly absorbing samples. The technique and apparatus of the present invention allows very efficient excitation of thin films or layers. By placing the detector on one side and the sample on the other side of the cell, the path length of the excited radiation within the sample becomes much smaller than the path length of the exciting beam through the sample, thus minimizing reabsorption of the excited radiation by the sample.

Lastly, by changing the incidence angle of the exciting beam on the totally reflecting surfaces (as for example, by using a number of cells with different bevel angles, or by changing the incident angle of the input beam to the cell, albeit sacrificing some accuracy), the extent of beam penetration will be varied. Thus, importantly, data can be obtained on depth variation of fluorescent properties. For example, in this manner one can study the differences, if any, between a layer of sample absorbed on the reflecting surface of the cell and more mobile, deeper portions of a sample.

Since certain changes may be made in the above apparatus and processes without departing from the scope of the invention herein involved it is intended that all matter contained in the above description or shown in the accompanying drawing shall be interpreted in an illustrative and not in a limiting sense.

What is claimed is:

1. A method of determining the fluorescent spectrum of a sample comprising the steps of;
    forming an interface between said sample and one reflecting surface of two opposed reflecting surfaces of a totally internally reflecting cell of material having a higher index of refraction than said sample;
    passing a beam of exciting radiation into said cell so that said beam traverses said cell by total internal reflection at least in part from said interface, and
    measuring fluorescent radiation arising at said interface and transmitted across said cell and through the other of said reflecting surfaces.

2. Method as defined in claim 1 including the steps of maintaining said beam at a fixed wavelength band; and
measuring said fluorescent radiation across a range of wavelengths.

3. Methods as defined in claim 1 including the steps of changing the wavelength band of said beam through a range of wavelengths and measuring said fluorescent radiation within a fixed wavelength band.

4. Method as defined in claim 1 wherein said interface is formed by establishing on said one reflecting surface a coating of material which can extract said sample from a dilute solution of the latter, and applying said dilute solution to said coating.

5. Method as defined in claim 1 including the step of varying the angle of incidence of said beam on said interface.